United States Patent [19]

Braun, Jr.

[11] Patent Number: 4,794,228

[45] Date of Patent: Dec. 27, 1988

[54] SELF-REGULATING HEATER ASSEMBLY

[75] Inventor: Fred P. Braun, Jr., Lake Quivira, Kans.

[73] Assignee: Heatron, Inc., Leavenworth, Kans.

[21] Appl. No.: 900,282

[22] Filed: Aug. 25, 1986

[51] Int. Cl.[4] ............................................. F27D 11/02
[52] U.S. Cl. .................................... 219/415; 126/33; 219/433; 219/436; 219/442; 219/544; 338/254
[58] Field of Search ............ 219/345, 415–419, 219/432, 433, 436, 438, 441, 442, 544, 548, 549; 338/247, 249, 254, 255; 126/33

[56] References Cited

U.S. PATENT DOCUMENTS

| | | | |
|---|---|---|---|
| 2,496,199 | 1/1950 | Bushway | 219/19 |
| 2,534,994 | 12/1950 | Scott et al. | 338/249 |
| 2,847,552 | 8/1958 | Gates | 126/33 |
| 2,976,391 | 3/1961 | Carlson | 126/33 |
| 3,364,844 | 1/1968 | Felske | 219/441 |
| 3,604,895 | 9/1971 | MacKay | 219/401 |
| 3,739,148 | 6/1973 | Ryckman, Jr. | 219/441 |
| 3,742,174 | 6/1973 | Harnden, Jr. | 219/10.49 |
| 3,808,573 | 4/1974 | Cappell | 338/249 |
| 4,013,869 | 3/1977 | Orts | 219/401 |
| 4,084,080 | 4/1978 | McMahan | 219/401 |
| 4,089,367 | 5/1978 | Wietzel et al. | 165/61 |
| 4,123,969 | 11/1978 | Abbate | 99/467 |
| 4,253,013 | 2/1981 | Mabuchi | 219/442 |
| 4,274,391 | 6/1981 | Karapefiad | 126/33 |
| 4,499,819 | 2/1985 | Bailey | 99/483 |

*Primary Examiner*—A. D. Pellinen
*Assistant Examiner*—Jeffrey A. Gaffin
*Attorney, Agent, or Firm*—Litman, McMahon & Brown

[57] ABSTRACT

A heater assembly includes a heater with an electrical resistance wire element bonded between first and second layers of silicone rubber insulation. First and second conductor plates each having inner and outer surfaces are clamped together with the heater between their inner surfaces. A resettable, thermostatic switch is mounted on the outer surface of one of the conductor plates and opens when the conductor plate reaches a predetermined temperature.

2 Claims, 1 Drawing Sheet

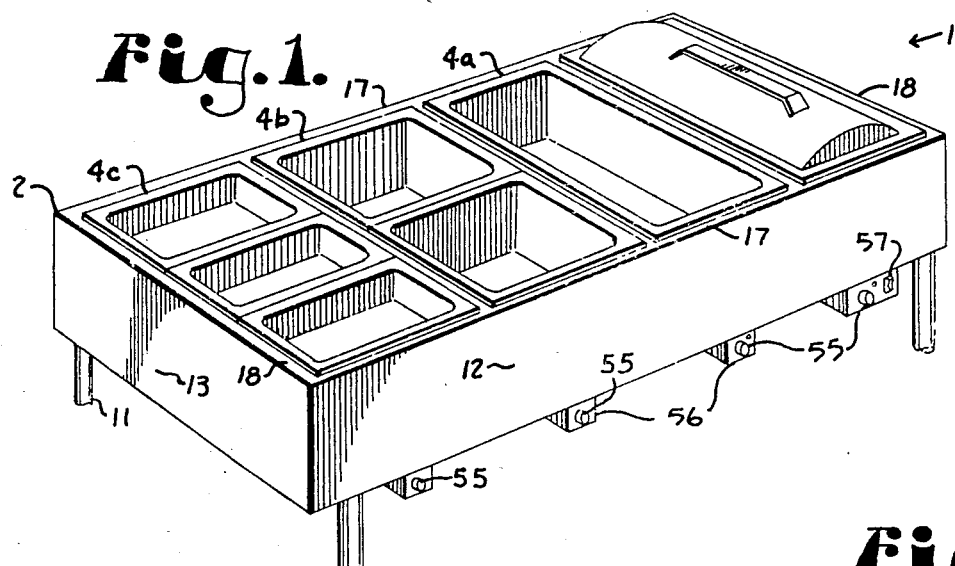
Fig. 1.
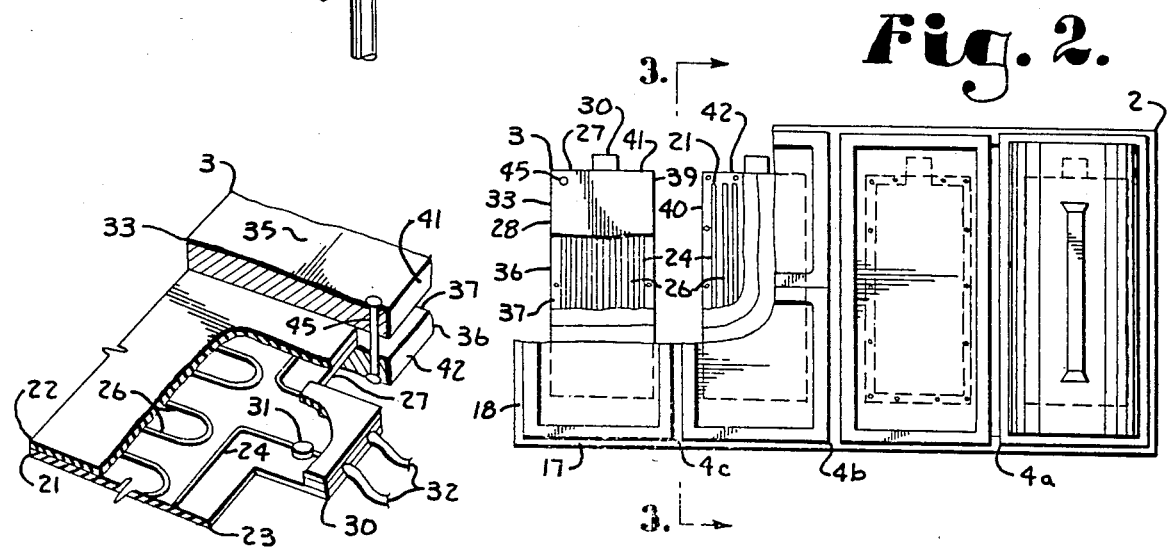
Fig. 2.
Fig. 4.
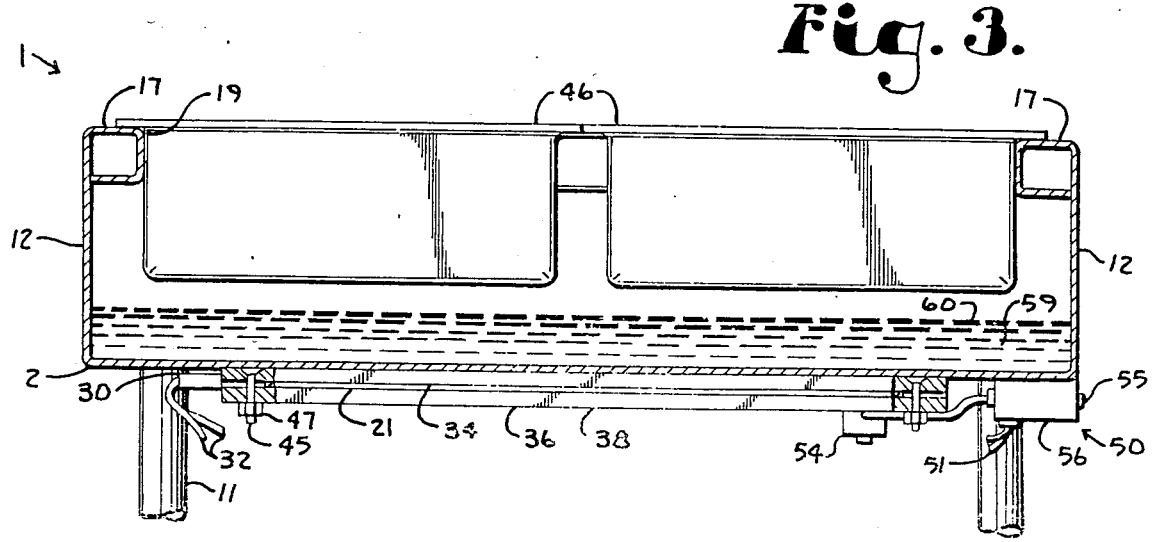
Fig. 3.

SELF-REGULATING HEATER ASSEMBLY

BACKGROUND OF THE INVENTION

1. Field of the Invention.

The present invention relates generally to a vessel heater assembly and in particular to an external, electrical heater assembly for a steam table.

2. Description of the Prior Art.

Vessels with heaters for heating their fluid contents are well known in the art. For example, steam tables are commonly used for food service by restaurants, cafeterias and other institutions for maintaining food at elevated temperatures. A typical steam table includes a relatively large vessel for containing water and one or more trays suspended over the water and adapted for containing the heated food.

In some of the prior art steam tables, submersible heaters are mounted within the vessels and comprise hollow tubes which contain electrical resistance wires. However, a problem with this type of steam table is that the tubular heaters are generally inserted through the walls of the vessels below their normal water lines. Rubberized gaskets are often provided to seal the heater openings, but they are susceptible to deterioration and failure, particularly since they are exposed to heat and humidity when the steam tables are in use. Another disadvantage of this arrangement is that the internal placement of the tubular heaters contributes to the cost of the steam tables. An example of this type of steam table is shown in the Bailey U.S. Pat. No. 4,499,819, which shows a conventional heating element mounted within the vessel of a steamer for restaurant use.

To avoid some of the aforementioned problems, steam tables with externally-mounted heaters have also been devised. For example, the McMahan U.S. Pat. No. 4,084,080 shows a towel heater and dispenser with an electrical heat resistance element mounted below the bottom of a water vessel. Another externally-mounted heater is shown in the Abbate U.S. Pat. No. 4,123,969, which discloses a yeast raising baking appliance wherein steam is generated in a water vessel with a perforated top. The bottom of the water vessel rests on electrical heating elements which in turn rest on a pad of thermal insulation.

Heretofore, steam tables have also been provided with heaters adhesively secured directly to the undersides of their vessels for conductively heating the vessel and convectively heating the water contained therein. Silicone rubber blanket heaters comprising fine resistance wires vulcanized between thin sheets of silicone rubber have previously been employed for this purpose. However, the blanket heaters often distort the bottoms of the vessels and such distortion can cause separation between the bottoms of the vessels and the blanket heaters with resultant "hot spots". Such hot spots can rapidly deteriorate a blanket heater because when pockets of separation are formed, conductive heat removal is impaired and convective heat removal is often insufficient to protect the separated portion of the blanket heater from overheating. Hence, the separated pockets tend to rapidly overheat in relation to the rest of the blanket heater, which overheating will eventually destroy the silicone rubber or the resistance wires or both.

Conventional thermostatic controls which are provided on many such steam tables usually offer no protection against such overheating because they are actuated by the temperature of the water in the vessel rather than the temperature at isolated locations on the blanket heater. Thus, even though the water temperature may be within normal operating limits, "runaway" heat gain may be experienced in certain pockets where separation from the vessel bottom occurs.

The thermostatic temperature controls that are used on many steam tables also have some disadvantages. With such temperature controls, a typical heater operates at full power until the thermostatic switch opens at a predetermined upper limit temperature and no current is applied until the temperature falls to a predetermined lower limit, at which time the thermostatic switch closes and the cycle repeats. Such thermostatic control systems contribute to premature deterioration of the components which are subjected to frequent temperature changes over a relatively broad range.

Another disadvantage with thermostatically-controlled heaters is that they are often intentionally oversized to operate at higher temperatures than are normally required so that the vessel water temperatures can be relatively rapidly increased. The higher operating temperatures of such heaters and their frequent on-off cycling tend to be relatively inefficient from the standpoint of energy consumption. Furthermore, the thermostatic switches contribute significantly to the costs of the steam tables on which they are mounted. Some of the problems with thermostatic switch heat controls can be avoided by using solid state, non-cycling temperature controls, but these tend to be even more expensive than thermostatic controls.

Heretofore, there has not been a heater assembly suited for steam table use with the advantages and features of the present invention.

SUMMARY OF THE INVENTION

In the practice of the present invention, a heater assembly is provided which includes a heater with a self-regulating electrical resistance wire element. The resistance wire element is placed between first and second layers of fiberglass-reinforced silicone rubber insulation. First and second conductor plates of rigid aluminum have inner and outer surfaces and the heater assembly is clamped together by mechanical fasteners with the heater between the conductor plate inner surfaces in substantially continuous contact therewith. The heater assembly is adapted for mounting on a vessel panel with mechanical fasteners that clamp the conductor plates together. A resettable, thermostatic switch is mounted on one of the conductor plate outer surfaces and opens when the conductor plate reaches a predetermined temperature. The thermostatic switch remains open until manually reset.

OBJECTS OF THE INVENTION

The principal objects of the present invention are: to provide a heater assembly for a vessel; to provide such a heater assembly which utilizes a silicone rubber blanket heater; to provide such a heater assembly wherein the heater is clamped between a pair of relatively rigid conductor plates; to provide such a heater assembly which resists deformation in operation; to provide such a heater assembly which includes a resettable, thermostatic switch; to provide such a heater assembly wherein the switch opens at a predetermined temperature and remains open until manually closed; to provide such a heater assembly which includes a self-regulating wire heating element with a relatively high percentage of increase in resistance in response to increases in temperature; to provide such a heater assembly which is particularly well adapted for use on a steam table; to provide such a heater assembly which is adapted to operate continuously until all of the water in the steam table is converted to steam; to provide such a heater assembly which may be completely externally mounted on a steam table; to provide such a heater assembly which does not require openings in the steam table for heater elements; to provide such a heater assembly wherein the conductor plates uniformly remove the heat from the heater; to provide such a heater which eliminates the need for a cycling thermostatic temperature controller; and to provide such a heater assembly which is economical to manufacture, efficient in operation, capable of a long operating life and particularly well suited for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a steam table with heater assemblies embodying the present invention.

FIG. 2 is a plan view of the steam table with portions broken away to reveal the construction of the heater assemblies.

FIG. 3 is an enlarged, transverse cross-sectional view of the steam table taken generally along line 3—3 in FIG. 2.

FIG. 4 is an enlarged, perspective view of the steam table, particularly showing the construction of a heater assembly.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. For example, multiple heater assemblies embodying the present invention are shown and described in connection with a single vessel comprising a steam table for multiple food trays. Heater assemblies embodying the present invention, however, could be applied singly to vessels designed for holding only one food tray each.

Referring to the drawings in more detail, the reference numeral 1 generally designates a steam table including a vessel 2, a heater assembly 3 embodying the present invention and large, medium and small food pans 4a, b and c.

The vessel 2 is generally rectangular in plan and is supported by legs 11. The vessel 2 includes opposite sides 12, opposite ends 13 and a bottom 14. The upper edges of the sides and ends 12, 13 form hollow, tubular flanges 17, 18 respectively which form the perimeter of an open top 19 of the vessel 2. The vessel 2 is preferably formed of sheet metal, for example stainless steel, suitably fastened together and made watertight at the intersections of the various panels by welding, brazing, etc.

Four heater assemblies 3 are shown mounted on the vessel 2 transversely across its bottom 14 and each includes a flexible, silicone rubber heater 21 of the type commonly referred to as a "blanket" heater. The heater 21 includes upper and lower layers of fiberglass-reinforced silicone rubber 22, 23 with a resistance element 24 sandwiched therebetween. The silicone rubber layers 22, 23 are relatively thin, e.g. in the range of about 0.005 to 0.05 inches thick.

The resistance element 24 comprises self-regulating wire spiral-wound around a fiberglass cord. The element 24 forms a path in the heater 21 comprising a plurality of parallel rows 26 extending between opposite heater ends 27 and parallel to heater sides 28. However, the resistance element 24 may assume a variety of different paths within the heater 21, with the primary objective being relatively uniform heat transfer over the entire area of the heater 21. The self-regulating wire has a relatively high percentage of resistance change with respect to temperature so that it tends to stabilize at a relatively low temperature in a relatively short period of time, particularly as compared to nichrome wire elements which are also commonly used for resistance heaters.

The heater 21 includes a terminal flange 30 projecting from an end 27 and enclosing terminals 31 whereat the resistance element 24 is connected to a pair of wire leads 32. The assembled heater 21 is vulcanized whereby the layers 22, 23 are securely bonded together and strengthened with the element 24 therebetween. The plates 33, 36 preferably comprise aluminum, but other thermally conductive materials could be used in place thereof.

Each heater assembly 3 includes an upper conductor plate 33 with inner and outer surfaces 34, 35 and a lower conductor plate 36 with inner and outer surfaces 37, 38. Each pair of conductor plates 33, 36 is clamped together against the vessel bottom 14 with a respective heater 21 between the respective inner surfaces 34, 37 thereof. The upper conductor plates 33 have opposite side and end margins 39, 41 and the lower conductor plates 36 have opposite side and end margins 40, 42. The conductor plates 33, 36 are slightly larger than the heaters 21 clamped therebetween whereby the margins 39-42 of the former project outwardly from the heater ends and sides 27, 28.

Although each heater assembly 3 is shown with a respective pair of conductor plates 33, 36, all four of the heaters 21 could alternatively be clamped between a single upper plate and a single lower plate, both of which would be sized to cover a substantial portion of the steam table bottom 14.

The heater assemblies 3 are clamped together and secured to the vessel bottom 14 by threaded studs 45 projecting downwardly from the vessel bottom 14. As shown in FIG. 2, the studs 45 are arranged in four generally rectangular patterns so that four studs in spaced relation extend through receivers 46 in each conductor plate side margin 39, 40 and four studs 45 extend through receivers 46 in each conductor plate end margin 41, 42. Each stud 45 receives a respective nut 47. The conductor plates 37, 38 are preferably about $\frac{1}{8}$ inch to $\frac{1}{4}$ inch thick for heaters 21 which are about sixteen inches long and eight inches wide. The conductor plates 37, 38 tend to remain flat in operation unlike the vessel bottom 14 which, in most vessels of this type, is not thick enough to resist deformation when heated.

An electrical system 50 includes a main power line 51 which is connected to a suitable power source, for example 110 volt or 208 volt, 60 Hz. alternating current and an on-off switch 57. A resettable thermostatic switch 54 is placed in series with the main power line 51 and is attached to the lower conductor plate 38 of each heater assembly 3. The thermostatic switch 54 is preset to open at a predetermined temperature. The heater assemblies 3 are connected to the main power line 51 at their respective leads 32, with the thermostatic switches 54 in series between respective heater assembly leads 32 and the main power line 51. Indicator lights 55 are mounted on junction boxes 56 below one of the vessel sides 12. In the electrical system 50, the indicator lights 55 are located in series between respective thermostatic switches 54 and heater assembly leads 32 so that when each is illuminated it indicates that a respective thermostatic switch 54 is closed and conversely when it is not illuminated it indicates that the thermostatic switch 54 is open.

In operation, water 59 is placed in the vessel 2 to a level 60 between the vessel bottom 14 and the bottoms of the trays 4a, b and c. The on-off switch 57 is switched to its on position whereby the heaters 21 are energized. The power output of the resistance elements 24 is expressed by the following formula:

$$\text{power} = \frac{\text{voltage}^2}{\text{resistance}}$$

The resistance of the self-regulating wire increases by a relatively high percentage in response to increasing temperature. Thus, the "cold resistance" of the resistance elmments 24, i.e. before current is applied, is greater than their resistance at operating temperatures. When current is applied, the temperature of the resistance elements 24 rises as does their resistance, and according to the above formula, the power output decreases. The decreasing power output slows the temperature gain until a condition of equilibrium is reached whereat all of the above variables, i.e. power, voltage and resistance, tend to remain fairly constant. Heat is transmitted primarily by conduction and convection to the water 59 which, upon reaching a sufficient temperature, is converted to steam and warms the trays 4a, b, and c and the contents thereof. The energy input to the water 59 approximately equals the energy output in the form of steam whereby the water temperature tends to stabilize.

The rigid conductor plates 33, 36 resist buckling so that the heaters 21 are relatively tightly clamped therebetween over substantially their entire areas. Thus, the tightly-clamped conductor plates 37, 38 cooperate to conduct the heat away from the heaters 21 in a fairly uniform manner so that the heat is evenly dispersed.

Even heat dispersion and the elimination of "hot spots" contribute to longer life for the heaters 21. Since the self-regulating feature of the resistance elements 24 controls the temperature, the vessel bottom 14 is less likely to buckle so that more heat is conducted directly from the upper conductor plates 33 to the vessel bottom 14 and hence by induction the heat is transferred to the water 59. Longer operating life for the heaters 21 is also achieved by running them continuously, as opposed to thermostat-controlled heaters that are subjected to repeated on-off cycles.

When substantially all of the water 59 has been converted to steam, the temperature of the vessel 2, and particularly its bottom 14, will rise, along with that of the heaters 21 and the conductor plates 33, 36. When each lower conductor plate 36 reaches a predetermined temperature, the thermostatic switch 54 mounted thereon opens and a respective indicator light 55 is extinguished, which signals an operator that the vessel 2 should be refilled and the thermostatic switch 54 reset to resume operation. The thermostatic switches 54 are set at a temperature which would not be attained during normal operation with the heat being removed by the water 59 during its conversion to steam. However, the preset temperature is low enough that the heater assembly 3 will not be damaged by the temperature increase that occurs when the vessel 2 empties of the water 59.

The self-regulating feature of the wire resistance elements 24 cooperates with the thermostatic switches 54 to dampen temperature increases and thus avoid damage to the heaters 21. The damping effect of the self-regulating wire works in this manner: Without the water 59 to remove heat in the process of steam conversion, the temperature of the heater assemblies 3 and the vessel 2 begins to rise. The temperature of the wire resistance elements 24 also begins to rise because their hotter surroundings are not able to absorb as much heat. A characteristic of the self-regulating wire, however, is that a relatively large percentage of resistance increase occurs in response to temperature increases. Thus, the resistance elements 24 react relatively quickly in response to temperature increases to increase their resistance, which lowers their power output according to the above formula. Since the percentage of resistance change in response to temperature increase is relatively high, the power output of the resistance elements 24 is quickly damped in response to a temperature increase in the entire system. Of course, the heaters 21 are designed to raise the temperature of the lower conductor plates 36 to a level at which the thermostatic switches 54 will open, but this temperature is well below that which could damage the heaters 21. In particular, the heaters 21 are protected because their resistance elements 24 neither increase rapidly in temperature nor reach very high temperatures, even without the water 59 in the vessel 2.

It is to be understood that while certain forms of the present invention have been illustrated and described herein, it is not to be limited to the specific forms or arrangement of parts described and shown.

What is claimed and desired to be secured by Letters Patent is as follows:

1. A steam table assembly comprising:
   (a) a vessel having sides, ends, a bottom and an open top through which fluid to be heated is passed;
   (b) a heater assembly mounted on said vessel for heating fluid contained in said vessel, including:
      (1) upper and lower conductor plates;
      (2) resistance wire sandwiched between said conductor plates, said resistance wire having a resistance which is non-uniformly dependent on the temperature of the wire to increase rapidly as the temperature of the wire increases from ambient to operating temperature and then to increase only slowly as the temperature of the wire increases above operating temperature;

(3) means for attaching said upper and lower conductor plates together with said resistance wire sandwiched therebetween;
(4) source means for energizing said resistance wire; and
(5) cutoff means connected between said source means and said resistance wire and mounted on said lower conductor plate, including:
   (i) temperature sensing means for sensing the temperaure of said lower conductor plate;
   (ii) interrupt means connected to said temperature sensing means for automatically interrupting the flow of energy from said source means to said resistance wire when the temperature of said lower conductor plate increases to a predetermined level; and
   (iii) reset means for re-establishing the connection between said source means and said resistance wire, said reset means having operating means which must be manually operated to re-establish said connection between said source means and said resistance wire, said reset means being resettable only when said lower conductor plate temperature is below said predetermined level at which said energy flow is interrupted; and (c) said fluid in said vessel maintaining said lower conductor plate at an operating temperature below said predetermined level at which said energy flow is interrupted.

2. The steam table defined in claim 1 wherein said upper and lower conductor plates comprises a plurality of lower conductor plates, and wherein
   (a) said temperature sensing means senses the temperature of an associated one of said lower conductor plates;
   (b) said interrupt means connected to said temperature sensing means automatically interrupts the flow of energy from said source means to said resistance wire when the temperature of said associated one of said lower conductor plates increases to a predetermined level; and
   (c) said reset means re-establishes the connection between said source means and said resistance wire, said reset means having operating means which must be manually operated to re-establish the connection between said source means and said resistance wire, said reset means being resettable only when an associated one of said lower conductor plates temperature is below said predetermined level at which said energy flow is interrupted.

* * * * *